United States Patent
Seok

(10) Patent No.: US 8,929,219 B2
(45) Date of Patent: Jan. 6, 2015

(54) METHOD OF LIMITING TRANSMISSION RATE

(75) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 300 days.

(21) Appl. No.: 13/202,972

(22) PCT Filed: Aug. 7, 2009

(86) PCT No.: PCT/KR2009/004415
§ 371 (c)(1),
(2), (4) Date: Aug. 23, 2011

(87) PCT Pub. No.: WO2010/098519
PCT Pub. Date: Sep. 2, 2010

(65) Prior Publication Data
US 2011/0305217 A1   Dec. 15, 2011

Related U.S. Application Data

(60) Provisional application No. 61/154,770, filed on Feb. 24, 2009.

(51) Int. Cl.
| | |
|---|---|
| *H04L 12/26* | (2006.01) |
| *H04L 12/851* | (2013.01) |
| *H04W 28/12* | (2009.01) |
| *H04L 12/825* | (2013.01) |
| *H04L 12/801* | (2013.01) |

(52) U.S. Cl.
CPC ............... *H04L 47/10* (2013.01); *H04L 47/24* (2013.01); *H04W 28/12* (2013.01); *H04L 47/266* (2013.01); *H04L 47/14* (2013.01); *H04L 47/11* (2013.01)
USPC ........................................................ 370/235

(58) Field of Classification Search
USPC ........................................................ 370/329
See application file for complete search history.

(56) References Cited

U.S. PATENT DOCUMENTS

| | | | |
|---|---|---|---|
| 6,035,333 A * | 3/2000 | Jeffries et al. ................. | 709/224 |
| 6,170,022 B1 | 1/2001 | Linville et al. | |
| 6,628,613 B1 * | 9/2003 | Joung et al. .................... | 370/230 |
| 6,633,585 B1 * | 10/2003 | Ghanwani et al. ............. | 370/468 |
| 6,957,269 B2 * | 10/2005 | Williams et al. ............... | 709/235 |
| 7,761,589 B1 * | 7/2010 | Jain ................................ | 709/232 |
| 2003/0218981 A1 | 11/2003 | Scholten | |
| 2004/0013128 A1 * | 1/2004 | Moreton et al. ............... | 370/447 |
| 2005/0054294 A1 * | 3/2005 | Khun-Jush et al. ........... | 455/63.1 |
| 2006/0041676 A1 * | 2/2006 | Sherman ........................ | 709/231 |
| 2006/0088036 A1 | 4/2006 | De Prezzo | |
| 2007/0109970 A1 * | 5/2007 | Galimberti et al. ............ | 370/235 |
| 2007/0195798 A1 * | 8/2007 | Peng et al. ..................... | 370/400 |
| 2008/0267073 A1 * | 10/2008 | Thaler ............................ | 370/236 |

* cited by examiner

*Primary Examiner* — Minh-Trang Nguyen
(74) *Attorney, Agent, or Firm* — Lee, Hong, Degerman, Kang & Waimey

(57) ABSTRACT

A method for limiting a transmission rate is provided. The method includes receiving a pause management message comprising pause scheduling information including a pause time at which an uplink transmission of a data frame is to be paused and a paused duration indicating a duration during which transmission of the data frame is to be paused, and pause station information indicating a station which is to pause transmission the data frame, from an access point (AP); and pausing transmission of the data frame during the paused duration starting from the pause time according to the pause management message, and then resuming transmission. According to exemplary embodiments of the present invention, a transmission rate limiting mechanism suitable for a VHT WLAN can be provided.

11 Claims, 3 Drawing Sheets

| Order | Information |
|---|---|
| 1 | Category | ~510 |
| 2 | Action | ~520 |
| 3 | Paused STA Address | ~530 |
| 4 | Paused TID | ~540 |
| 5 | Paused Offset | ~550 |
| 6 | Paused Interval | ~560 |
| 7 | Paused Duration | ~570 |
| 8 | Paused Channel Set | ~580 |

METHOD OF LIMITING TRANSMISSION RATE

CROSS-REFERENCE TO RELATED APPLICATIONS

This application is the National Stage filing under 35 U.S.C. 371 of International Application No. PCT/KR2009/004415, filed on Aug. 7, 2009, and also claims the benefit of U.S. Provisional Application Ser. No. 61/154,770, filed on Feb. 24, 2009, the contents of which are all incorporated by reference herein in their entirety.

TECHNICAL FIELD

The present invention relates to a wireless local access network (WLAN) and, more particularly, to a method of limiting a transmission rate in a very high throughput (VHT) WLAN.

BACKGROUND ART

Recently, diverse wireless communication technologies are under development in line with the advancement of information communication technology. Among them, a wireless local area network (WLAN) is a technique allowing mobile terminals such as personal digital assistants (PDAs), lap top computers, portable multimedia players (PMPs), and the like, to wirelessly access the Internet at homes, offices or in a particular service providing area based on a radio frequency technology.

Since IEEE (Institute of Electrical and Electronics Engineers) 802, a standardization organization of a WLAN technique, was established in February 1980, a great deal of standardization works have been conducted.

The early WLAN technique supported the rate of 1-2 Mbps through frequency hopping, spread spectrum, infrared communications, and the like, by using a 2.4 GHz frequency based on IEEE 802.11, and recently a maximum rate of 54 Mbps can be supported by applying orthogonal frequency division multiplex (OFDM) technology to the WLAN. Further, IEEE 802.11 are putting standards of various techniques, such as improvement of quality of service (QoS), allowing compatibility of access point (AP) protocols, achievement of security enhancement, measurement radio resource measurement, wireless access vehicular environment, ensuring fast roaming, establishing a mesh network, interworking with an external network, wireless network management, and the like, into practical use or are still developing them.

Among the IEEE 802.11, IEEE 802.11b supports a maximum of 11 Mbs communication speed while using the frequency band of 2.4 GHz. IEEE 802.11a which has been commercialized following the IEEE 802.11b uses the frequency band of 5 GHz, not 2.4 GHz, to reduce the influence of an interference compared with the considerably congested frequency band of 2.4 GHz and has a communication speed increased up to a maximum 54 Mbps by using the OFDM technique. However, IEEE 802.11a has shortcomings in that its communication distance is shorter than that of IEEE 802.11b. Meanwhile, IEEE 802.11g uses the frequency band of 2.4 GHz, like IEEE 802.11b, to implement a communication speed of a maximum 54 Mbps and satisfies backward compatibility, and as such, IEEE 802.11g receives much attention. Also, IEEE 802.11b is superior to IEEE 802.11a, in the aspect of the communication distance.

IEEE 802.11n has been lately stipulated as a technique standard to overcome the limitation in the communication speed which has been admitted as a weak spot of the WLAN. IEEE 802.11n aims to increase the speed and reliability of a network and extend an operation distance of a wireless network.

In more detail, IEEE 802.11n supports a high throughput (HT) of more than a maximum 540 Mbps as a data processing speed, and is based on a multiple input and multiple output (MIMO) technique using multiple antennas at both ends of a transmission unit and a reception unit to minimize a transmission error and maximize a data rate.

Also, IEEE 802.11n standard may use orthogonal frequency division multiplex (OFDM) to increase the speed as well as using a coding scheme that transmits several duplicates to enhance data reliability.

As the WLAN is widely spreading and applications using WLAN are diversified, recently, the necessity for a new WLAN system emerges to support a higher throughput than the data processing speed supported by IEEE 802.11n. A very high throughput (VHT) WLAN system is one of the newly proposed IEEE 802.11 WLAN systems in order to support a data processing speed of 10 Gbps or faster. The term of VHT WLAN system is arbitrary, and currently, a feasibility test is performed on a 4×4 MIMO and a system using a channel bandwidth of 80 MHz or higher to provide throughput of 1 Gbps or faster.

The key application of IEEE 802.11 VHT is HD video streaming. To enhance the quality of service of HD video streaming, a rate limiting mechanism is used.

Rate limiting is used to control the rate of traffic sent or received on a network interface. Traffic that is less than or equal to the specified rate is sent, whereas traffic that exceeds the rate is dropped or delayed. A device that performs rate limiting is a rate limiter.

Rate limiting has been performed by policing (discarding excess packets), queuing (delaying packets in transit) or congestion control (manipulating the protocol's congestion mechanism).

For rate limiting in a wired network, Ethernet is utilizing PAUSE frame. PAUSE is a flow control mechanism on full duplex Ethernet link segments defined by IEEE 802.3x and uses MAC Control frames to carry the PAUSE commands. The MAC Control opcode for PAUSE is 0X0001 (hexadecimal). Only stations configured for full-duplex operation may send PAUSE frames.

When a station wishes to send a PAUSE command, it sends the MAC Control frame to the 48-bit destination multicast MAC address of 01-80-C2-00-00-01. This particular address has been reserved for use in PAUSE frames.

A PAUSE frame includes the period of pause time being requested, in the form of two byte unsigned integer (0 through 65535). This number is the requested duration of the pause. The pause time is measured in units of pause "quanta", where each unit is equal to 512 bit times.

In IEEE 802.11h, An AP in a BSS may schedule quiet intervals by transmitting one or more Quiet elements in Beacon frames and Probe Response frames. Quiet element has the Quiet Period field, the Quiet Duration field, and the Quiet Offset field. However, an effective method that may control a transmission rate without pausing all the transmissions is required.

DISCLOSURE OF INVENTION

Technical Problem

Therefore, an object of the present invention is to provide a transmission rate limiting mechanism suitable for a very high throughput (VHT) wireless LAN (WLAN). An overload can be prevented and radio resources can be effectively used by limiting a transmission rate.

Technical Solution

According to an aspect of the present invention, a method for limiting a transmission rate is provided. The method includes receiving a pause management message comprising pause scheduling information including a pause time at which an uplink transmission of a data frame is to be paused and a paused duration indicating a duration during which transmission of the data frame is to be paused, and pause station information indicating a station which is to pause transmission the data frame, from an access point (AP); and pausing transmission of the data frame during the paused duration starting from the pause time according to the pause management message, and then resuming transmission. According to exemplary embodiments of the present invention, a transmission rate limiting mechanism suitable for a VHT WLAN can be provided.

And according to another aspect of the present invention, a method for limiting a transmission rate in a wireless LAN system is provided. The method includes detecting, by an access point (AP), an overload generated in receiving a data frame from a station; and transmitting a pause management message for pausing uplink transmission of the data frame to the station; wherein the pause management message comprises pause scheduling information comprising a pause time at which transmission of the data frame is paused and a paused duration indicating a duration during which transmission of the data frame is paused, and pause station information indicating a station that transmits the data frame.

Advantageous Effects

According to exemplary embodiments of the present invention, a transmission rate limiting mechanism suitable for a VHT WLAN can be provided. In addition, an overload that has been already generated or that may be generated at traffic can be prevented without having to completely pause transmission.

Also, a channel state and the characteristics of a data frame can be reflected for a pause scheduling. Thus, a transmission rate can be controlled according to the characteristics of a data frame to thereby effectively utilize radio resources.

MODE FOR THE INVENTION

Figures 1, 2:
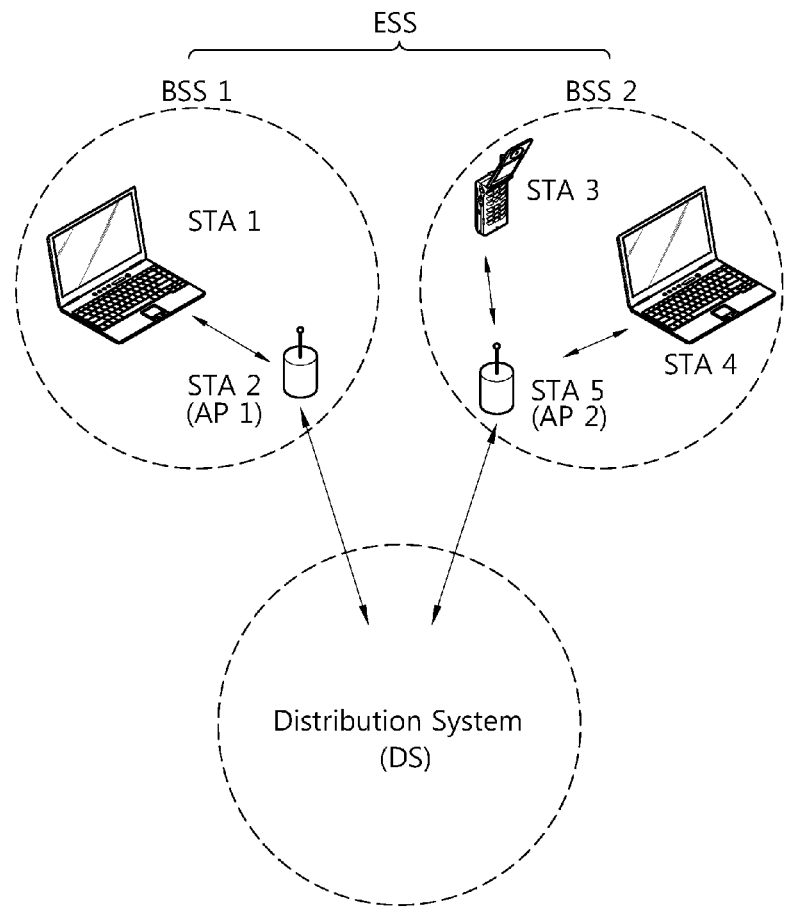
FIG. 1 illustrates the configuration of a very high throughput (VHT) WLAN that can employ an embodiment of the present invention.
FIG. 2 illustrates a quiet element used to limit a transmission rate according to the related art.

FIG. 1 illustrates the configuration of a very high throughput (VHT) WLAN that can employ an embodiment of the present invention.

With reference to FIG. 1, a WLAN system such as the VHT WLAN system includes one or more of basic service sets (BSSs). A BSS refers to a set of stations (STAs) that can communicate with each other in synchronization, not a concept indicating a particular area. Like the WLAN system to which the exemplary embodiments of the present invention are applicable, a BSS that supports the data processing at a high speed of 1 GHz or faster at a MAC SAP (service access point) is called a VHT BSS.

The VHT BSS may be divided into an infrastructure BSS and an independent BSS (IBSS). FIG. 1 illustrates the infrastructure BSS.

The infrastructure BSS (BSS1 and BSS2) includes one or more of non-AP STA1, non-AP STA3, and non-AP STA4, access points (APs) (AP STA1 and AP STA2), stations providing a distribution service, and a distribution system (DS) connecting the plurality of APs (AP STA1 and AP STA2). In the infrastructure BSS, the AP stations manage the NON-AP stations of the BSSs.

Meanwhile, the IBSS is a BSS operating in an ad-hoc mode. Because the IBSS does not include an AP VHT STA, it does not have a centralized management entity. Namely, in the IBSS, non-AP stations are managed in a distributed manner. In the IBSS, every station may be a mobile station, and the IBSS establishes a self-contained network, not allowing an access to a distribution system (DS).

A station is an arbitrary function medium including a medium access control (MAC) following the stipulation of IEEE 802.11 standard and a physical layer interface with respect to a wireless medium, and includes both AP and non-AP stations in a broad sense. A station supporting high speed data processing of 1 GHz or faster in a multi-channel environment (to be described) is called a VHT station. In the VHT WLAN system to which the exemplary embodiments of the present invention are applicable, stations included in the BSS may be all VHT stations, or in the BSS, VHT stations and legacy stations (e.g., an HT STA following IEEE 802.11n) may coexist.

A station for radio communications includes a processor, a transceiver, a user interface, and a display unit. The processor is a function unit devised to generate a frame to be transmitted via a wireless network or a frame received via the wireless network, performing various functions to control the station. The transceiver, which is functionally connected with the processor, is devised to transmit and receive frames via the wireless network for the station.

Among stations STAs, a mobile terminal manipulated by a user is a non-AP STA (STA1, STA3, STA4, STA6, STA7, and STA8), and simply referring to a station may indicate a non-AP STA. The non-AP STA may be referred to by other names such as terminal, wireless transmit/receive unit (WTRU), user equipment (UE), mobile station (MS), mobile terminal, mobile subscriber unit, or the like. A non-AP STA supporting high speed data processing at 1 GHz or faster in a multi-channel environment (to be described) is called a non-AP VHT STA or simply a VHT STA.

The APs (AP1 and AP2) are functional entities for providing an access to the DS by way of a wireless medium for an STA associated thereto. In the infrastructure BSS including the APs, in principle, communications between non-AP STAs are made by way of the APs, but when a direct link has been established, the non-AP STAs can directly communicate with each other. The AP may be also called by other names such as centralized controller, base station (BS), node-B, base transceiver system (BTS), site controller, and the like, than the AP.

In the multi-channel environment (to be described), an AP supporting high speed data processing at 1 GHz or faster is called a VHT AP.

A plurality of infrastructure BSSs may be connected via the DS. The plurality of BSSs connected via the DS is called an extended service set (ESS). STAs included in the ESS may communicate with each other, and the non-AP STA may move from one BSS to another BSS within the same ESS while seamlessly performing communication.

The DS is a mechanism allowing one AP to communicate with another AP. Through the DS, an AP may transmit a frame for STAs associated to the BSS managed by the AP, transfer a frame when one STA moves to another BSS, or transmit or receive frames to and from an external network such as a wireline network. The DS is not necessarily a network. Namely, the DS is not limited to any form so long as it can provide a certain distribution service defined in IEEE 802.11 standard. For example, the DS may be a wireless network such as a mesh network or a physical structure connecting the APs.

FIG. 2 illustrates a quiet element used to limit a transmission rate according to the related art.

In the BSS, the AP may schedule a quiet interval. The quiet interval may be scheduled by the AP by including one or more quiet elements in a beacon frame and a probe response frame and transmitting the same.

The quiet element may include an element ID field, a length field, a quiet count field, a quiet period field, a quiet duration field, a quiet offset field, and the like.

The element ID field is set as a certain value indicating a quite element. The length field may be set as a value indicating the entire length of subsequent fields by octet.

The quite count field may be set as a value indicating the number of target beacon transmission time (TBTT) until a beacon interval at which a next quiet interval starts. If the quiet count field is set as 1, it may indicate that the quite interval starts during a beacon interval starting from a next TBTT. The TBTT starts as a beacon frame is transmitted, and a duration until when a next beacon frame is transmitted corresponds to the TBTT.

The quiet period field may be set as a value indicating the number of beacon intervals between starts of regularly scheduled quiet intervals defined by the quiet element. If the quiet period field is set as 0, it indicates that a periodical quiet interval is not defined.

The quiet duration field may be set as a value indicating a duration of the quiet interval, and the quiet offset field may be set as a value indicating an offset between a start time of the quiet interval and a TBTT specified by the quiet count field. The value set in the quiet count field is smaller than the beacon interval.

When the quiet element is in use, a transmission or a transmission rate is controlled in an on/off manner. Namely, transmission is temporarily stopped over every channel during the quiet interval irrespective of a data type of each transmitted data or priority of each transmission. Thus, an effective method that can control a transmission rate without pausing every transmission is required.

Figure 3:
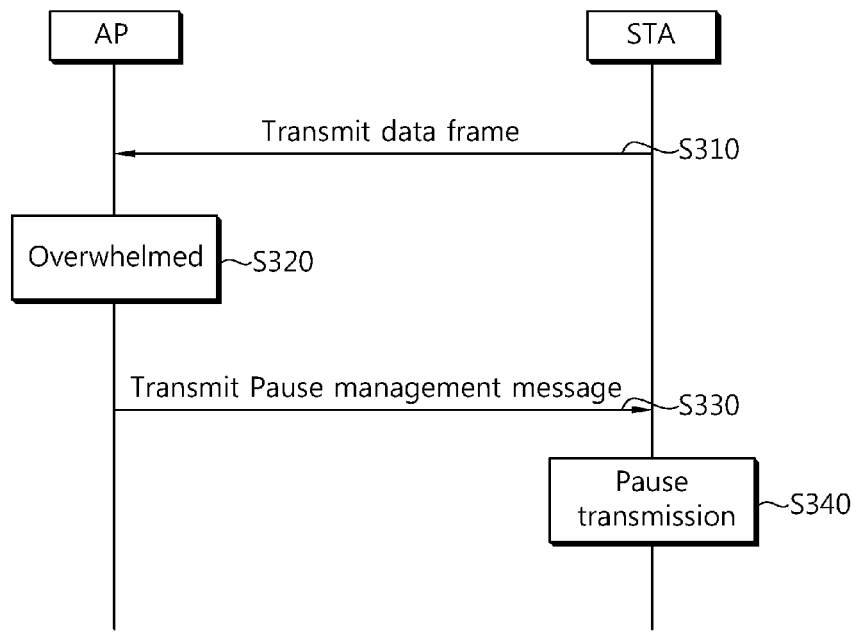
FIG. 3 is a flow chart illustrating a method for limiting a transmission rate according to an exemplary embodiment of the present invention.

FIG. 3 is a flow chart illustrating a method for limiting a transmission rate according to an exemplary embodiment of the present invention.

In the exemplary embodiment described with reference to FIG. 3, it is assumed that as a station transmits uplink data to an AP, the AP, which receives the uplink data, is overloaded.

First, the station transmits uplink data to the AP (S310). The station that transmits the uplink data to the AP may be called a transmission station. In this case, if the station transmits an excessive amount of data without consideration of a buffer capacity of the AP, or if a transmission rate of the uplink data is too large for the buffer capacity of the AP, the AP is overloaded (S320).

Then, the AP transmits a pause management message to the transmission station (S330). The pause management message may have a format of a pause management action frame. The pause management action frame will be described later.

The pause management message includes information for scheduling pause of a data frame transmission of the station. The pause scheduling information may be information about a paused duration indicating how long transmission of a data frame is to be paused, and in case where transmissions and pauses are repeatedly performed, the pause scheduling information may be information about a period of such repetition and an interval of the repetition.

If the pause management message is transmitted to a plurality of stations, the pause management message may include information indicating a target station of the pause management message. A station subjected to the transmission pause or a transmission rate control may be called a pause station, and information indicating which station is a pause station may be called pause station information.

If the degree of pause or transmission rate control is changed according to an access category of a data frame, the pause management message may include information about an access category. In this case, the pause scheduling information has a value varied according to the access category information.

When the transmission station receives the pause management message, it temporarily stops transmission or lowers a transmission rate through a method of repeatedly performing transmission of a data frame and pausing transmission and the like (S340). The transmission station may determine how long a data transmission is to be paused, in which pattern the data transmission and transmission pause are to be repeated, how low the transmission rate is to be dropped, and the like, according to the information included in the pause management message. As a format of the pause management message, the format of a pause management action frame of IEEE 802.11 can be used.

Namely, if the transmission station transmits an excessive amount of a data frame for the buffer of a reception station, the AP may provide control to transmit the pause management message to the transmission station to reduce a transmission rate to the AP.

The AP may transmit the pause management message by using a directional antenna or an omnidirectional antenna. In particular, the AP may transmit the pause management message in an omnidirectional mode or in a broadcast manner. This may bring about a situation in which a plurality of stations receive the pause management message transmitted by the AP. Upon receiving the pause management message, the stations determine whether to pause transmission of a data frame or whether to limit a transmission rate according to the pause station information among information included in the pause management message.

Or, upon receiving the pause management message, the stations may check which station or which channel traffic whose transmission rate is to be controlled by the AP corresponds to through the pause management message. Namely, the pause management message may include identification information of traffic targeted for limitation of the transmission rate. Accordingly, the stations reduce the transmission amount of the data frame or temporarily stop transmission of the data frame of a type designated by the pause management message. In this case, information about a duration of transmission pause during which transmission of the data frame is temporarily stopped may be set to be different for each station or each traffic.

Namely, when the station, which has been transmitting a data frame, receives the pause management message, it temporarily stops transmission of the data frame during the designated duration or limits the transmission rate at a designated point of time according to the information included in the received pause management message. In addition, in case where the station repeats transmitting of the data frame to the AP and pausing the transmissions one or more times within a single TBTT, it may repeat transmitting and pausing according to paused interval information.

Meanwhile, priority may be given according to the access categories of data frames. That is, limitation of the transmission rate or pausing of transmission may be differently performed according to priority. This will be described in detail later with reference to FIG. 4.

Figures 4, 5:
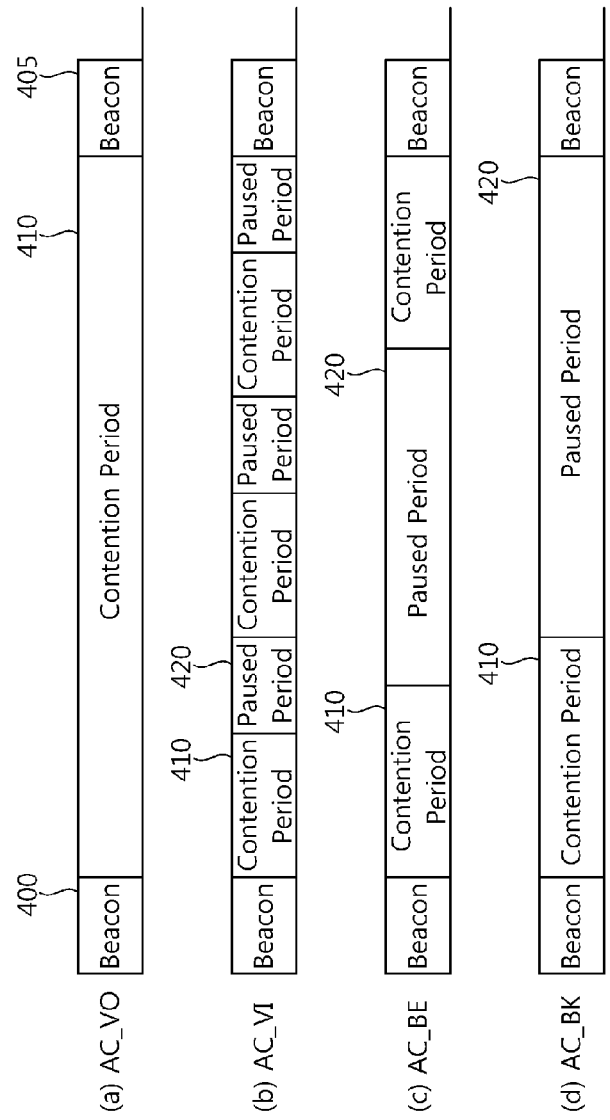
FIG. 4 illustrates the method for limiting a transmission rate according to an exemplary embodiment of the present invention.
FIG. 5 illustrates a format of a pause management message transmitted according to an exemplary embodiment of the present invention.

FIG. 4 illustrates the method for limiting a transmission rate according to an exemplary embodiment of the present invention. The method for limiting a transmission rate according to each data type will now be described.

The data frames uplink-transmitted to the AP by the station may be classified into four types of access categories according to their traffic characteristics. In addition, priority may be differently set for these access categories. The four access categories include AC_VO (Access Category_Voice), AC_VI (Access Category_Video), AC_BE (Access Category_Best Effort), and AC_BK (Access Category_Background).

In FIG. 4, (a), (b), (c), and (d) show channels for transmitting frames according to the access categories of data based on a time axis, respectively. Specifically, (a) shows a transmission channel of a voice data frame with an access category of AC_VO (access Category_Voice), (b) shows a transmission channel of a video data frame with an access category of AC_VI (Access Category_Video), (c) shows a best-effort data frame with an access category of AC_BE (Access Category_Best Effort), and (d) shows a transmission channel of a background data frame with an access category of AC_BK (Access Category_Background).

The AP sets a paused period and a contention period according to each access category. As the contention period becomes long and as the paused period becomes short, the probability of acquiring a channel access opportunity or a transmission opportunity for transmitting a data frame of a corresponding access category increases, and resultantly, the corresponding access category has a high priority level.

The contention period refers to a duration during which transmission of a data frame is permitted, and the paused period refers to a duration during which transmission of the data frame is temporarily stopped. With reference to FIG. 4, it is noted that the contention period and the paused period are differently controlled by channel depending on the action categories of data frames according to the pause management message or the pause management action frame transmitted by the AP.

After a beacon frame 400 is transmitted, transmission of a data frame and pausing transmission may repeat until when a next beacon frame 405 is transmitted. When the pause management access frame is received, the station sets a network allocation vector (NAV) and freezes (i.e., temporarily stops) a current backoff timer corresponding to a paused TID (Traffic Identifier), thereby preventing accessing a wireless medium during the paused period.

Meanwhile, channel accessing is allowed during a non-paused period, namely, during the contention period. During the contention period, the station may reset the NAV and release the freezing of the backoff timer, to allow accessing a wireless medium.

In case of the AC_VO in (a), the contention period 410 continues without a paused period. Namely, according to an exemplary embodiment illustrated in FIG. 4, a voice data frame, a data frame with the highest priority level, is transmitted without a pause, resulting in that it most preferentially obtains the transmission opportunity.

In case of transmission of a video data frame (i.e., the data frame with an access category of AC_VI) in (b), the contention period 410 is short while the paused period 420 is also short. If transmission of the video data frame is not successfully transmitted during the first contention period 410, it can be transmitted during another contention period 410 following the short paused period 420. Because the contention periods 410 are repeated, the data frame with the access category of AC_VI can obtain a relatively frequent transmission opportunity.

Compared with the data frames with the access categories AC_VO and AC_VI, the data frames AC_BE and AC_BK with the relatively low priority levels have the paused period 420 longer than the contention period 410. The interval between the contention periods 410 corresponds to the paused period 420. In this case, the periods during which channel accessing a wireless medium (i.e. contention period) is allowed is repeated but the interval (i.e. paused period) is long, so these data frames cannot frequently obtain the transmission opportunity. Resultantly, the data frames AC_BE and AC_BK have a lower priority level in the uplink transmission.

That is, as described above, the AP may transmit the pause management access frame to a station by differing the information such as the paused duration varied according to access categories. The priority levels of the access categories may be given depending on the paused period, the paused duration, the paused interval, a duration of the contention period, or an interval of the contention period according to these values (i.e., the value of the paused period, the paused duration, the paused interval).

FIG. 5 illustrates a format of the pause management message transmitted according to an exemplary embodiment of the present invention.

The pause management message as transmitted according to the exemplary embodiments described above with reference to FIGS. 3 and 4 may follow the format of the pause management action frame, and FIG. 5 illustrates the format of the pause management action frame. In FIG. 5, the order of the fields is shown, but the present invention is not limited thereto and the scope of the present invention is not limited by the order of the fields.

The pause management action frame includes a category field 510, an action field 520, a paused STA address field 530, a paused TID (Traffic Identifier) field 540, a paused offset field 550, a paused interval field 560, a paused duration field 570, a paused channel set field 580, and the like.

The AP may transmit the pause management action frame to each station. If a buffer is overloaded due to uplink transmission of the stations, the AP transmits the pause management action frame to the corresponding station which has uplink-transmitted an excessive amount of data.

Information for controlling a transmission rate or transmission pause may be included, particularly, in the paused STA Address field 530, the paused TID field 540, the paused offset field 550, the paused interval field 560, and the paused duration field 570, in the pause management action frame.

The pause management action frame may include pause station information. For example, an address of a station targeted for pausing transmission by the AP may be included as a paused station address in the paused STA Address field 530 of the pause management action frame.

Here, the paused station address may be a unicast address or a group address. If a transmission rate of a data frame according to transmission in a multicast manner is excessive, the AP may designate a group address to limit corresponding traffic.

Also, the paused STA Address may be a MAC (Media Access Control) address of a corresponding transmission station. Namely, the paused station address of the paused STA Address field 530 may be set as a MAC address of a receiver whose data frame reception is to be paused or limited by the pause management action frame.

The paused TID of the paused TID field 540 is set as a TID of paused traffic. Namely, the AP may designate overloaded traffic to thus control transmission pause.

The pause management action frame includes pause scheduling information regarding pause of transmission from the station to the AP and resuming of transmission. The pause scheduling information indicate when data frame transmission is paused, how long the data frame transmission is paused, when the data frame transmission is resumed, what kind of repetition period of pausing and resuming, and the like. The pause scheduling information is included in the fields such as the paused offset field 550, the paused interval field 560, and the paused duration field 570.

The paused offset in the paused offset field 550 refers to a time duration starting from the TBTT (Target Beacon Transmission Time) to a point of time from which a pause time starts. For example, if the paused offset is 10?s, the pause time starts in 10?s after (i.e., from a point of time when) a next beacon frame is received (or after a next TBTT starts).

The paused interval field 560 includes information indicating a temporal interval between pause times. The paused interval is set as an interval between consecutive paused times.

The paused duration field 570 includes information about a paused duration which is set as the length of the paused time.

The station postpones channel accessing for paused traffic as long as the paused duration by freezing the current backoff timer for the paused TID.

As afore-mentioned, the pause scheduling information may be set to be different according to an access category of a data frame to be transmitted. Namely, because the paused interval, the paused duration, etc., are differently set according to the priority level of the access categories of the data frames, the transmission amount can be more effectively controlled for user convenience.

The paused channel set field 580 is set as the number of a channel subjected to a transmission pause or a limitation of the transmission rate.

If the field value of the paused set field 580 is set as a value not 0, the station may postpone channel accessing to a particular sub-channel of 20 MHz. If the field value of the paused channel set field 580 is set as 0, the station postpones channel accessing to every channel.

This is because the VHT BSS uses a broadband channel of 80 MHz, and the AP can specify a paused channel set. Here, the paused channel refers to a sub-channel of 20 MHz.

The method described so far may be implemented by microprocessors, controllers, microcontrollers, application specific integrated circuits (ASICs), and the like, according to software or program codes coded to perform the methods. Designing, developing, and implementing of the codes may be obvious to the skilled person in the art based on the description of the present invention.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

The invention claimed is:

1. A method for transmitting at least one data frame, performed by a transmitting station, in a wireless LAN system, the method comprising:
   receiving, from a requesting station, a pause management message comprising pause scheduling information and pause station information, the pause scheduling information indicating a duration during which transmission of at least one data frame is to be paused without pausing a transmission a control frame, the pause station information indicating a target station which is a target of the transmission of the at least one data frame to be paused;
   without pausing the transmission of the control frame, pausing the transmission of the at least one data frame to the target station during the duration indicated by the pause scheduling information; and
   resuming the transmission of the at least one data frame to the target station on expiration of the paused duration.

2. The method of claim 1, wherein the pause management message further comprises one or more pieces of information regarding a paused interval indicating a temporal interval of pause in a case where the transmission of at least one data frame is repeatedly paused and information regarding a duration of a contention period during which the at least one data frame are transmitted without a pause.

3. The method of claim 2, wherein when the at least one data frame correspond to an access category with a higher priority level, the paused duration included in the pause management message is set to be short.

4. The method of claim 2, wherein when the at least one data frame correspond to an access category with a higher priority level, the temporal interval of pause in the pause management message is set to be long.

5. The method of claim 1, wherein the pause management message further comprises one or more pieces of more information regarding a channel via which the at least one data frame is transmitted and information regarding a traffic identifier (TID) in which the at least one data frame is transmitted.

6. The method of claim 1,
   wherein the pause management message is transmitted by unicast transmission, and
   wherein the pause management message further comprises an identifier of the transmitting station.

7. The method of claim 6,
   wherein the pause management message is transmitted by broadcast transmission.

8. The method of claim 1,
   wherein the target station is the AP, and
   wherein the pause station information is set to a value related with a BSSID (Basic Service Set ID) of the AP.

9. The method of claim 1, wherein a back-off timer associated with channel access is stopped by the transmitting station when the transmission of the at least one data frame is paused.

10. The method of claim 1, wherein the control frame control frame does not have a traffic identifier (TID).

11. A station transmitting at least one data frame in a wireless LAN system, the station comprising:
   a radio unit transmitting a signal; and a processor coupled to the radio unit and configured to:
- receive, from a requesting station, a pause management message comprising pause scheduling information and pause station information, the pause scheduling information indicating a duration during which transmission of at least one data frame is to be paused without pausing a transmission a control frame, the pause station information indicating a target station which is a target of the transmission of the at least one data frame to be paused,
- without pausing the transmission of the control frame, pause the transmission of the at least one data frame to the target station during the duration indicated by the pause scheduling information, and
- resume the transmission of the at least one data frame to the target station on expiry of the paused duration.

* * * * *